(12) United States Patent
Terashima et al.

(10) Patent No.: US 7,907,088 B2
(45) Date of Patent: Mar. 15, 2011

(54) POSITIONING DEVICE, CONTROL METHOD OF POSITIONING DEVICE, CONTROL PROGRAM FOR POSITIONING DEVICE, AND COMPUTER-READABLE RECORDING MEDIUM HAVING POSITIONING DEVICE CONTROLLING PROGRAM RECORDED THEREIN

(75) Inventors: Maho Terashima, Matsumoto (JP); Tomoyu Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 123 days.

(21) Appl. No.: 11/312,554

(22) Filed: Dec. 21, 2005

(65) Prior Publication Data

US 2006/0227044 A1    Oct. 12, 2006

(30) Foreign Application Priority Data

Dec. 22, 2004    (JP) ................. 2004-371510

(51) Int. Cl.
G01S 19/22    (2010.01)
(52) U.S. Cl. .................................. 342/357.61
(58) Field of Classification Search ........... 342/357.01–357.17, 357.2–357.78
See application file for complete search history.

(56) References Cited

U.S. PATENT DOCUMENTS

| | | | |
|---|---|---|---|
| 4,949,268 A * | 8/1990 | Nishikawa et al. | 701/216 |
| 5,565,909 A * | 10/1996 | Thibadeau et al. | 725/35 |
| 5,952,961 A | 9/1999 | Denninger | |
| 6,429,814 B1 * | 8/2002 | van Diggelen et al. | 342/357.13 |
| 2002/0015439 A1 | 2/2002 | Kohli et al. | |
| 2002/0050944 A1 * | 5/2002 | Sheynblat et al. | 342/357.06 |
| 2002/0113719 A1 | 8/2002 | Muller et al. | |
| 2002/0120632 A1 | 8/2002 | Gremmert et al. | |
| 2004/0150559 A1 | 8/2004 | Spilker, Jr. et al. | |

FOREIGN PATENT DOCUMENTS

| | | |
|---|---|---|
| JP | S63-091584 A | 4/1988 |
| JP | S05-026678 A | 2/1993 |
| JP | S08-338738 A | 12/1996 |
| JP | H09-236650 A | 9/1997 |
| JP | S11-166827 A | 6/1999 |
| JP | 2000-346655 A | 12/2000 |
| JP | 2001-272450 A | 10/2001 |
| JP | 2001272450 A | 10/2001 |
| JP | 2003-514215 T | 4/2003 |
| WO | WO-00/45191 A2 | 8/2000 |
| WO | WO-02/091014 A2 | 11/2002 |

\* cited by examiner

Primary Examiner — Thomas H Tarcza
Assistant Examiner — Nga X Nguyen
(74) Attorney, Agent, or Firm — Global IP Counselors, LLP

(57) ABSTRACT

A positioning device for receiving a satellite signal corresponding to a signal from a positioning satellite including a multipath recurrent district elevation information storing unit for storing multipath recurrent district elevation information indicating the elevation of a multipath recurrent district as elevation information of plural divisional areas, an elevation information obtaining position information generating unit for receiving the satellite signals and generating elevation information obtaining position information to obtain the elevation information, an elevation information obtaining unit for obtaining the elevation information of the divisional area corresponding to the elevation information obtaining position information and an elevation information using present position information generating unit for generating elevation information using present position information indicating the present position on the basis of the satellite signals and the elevation information.

8 Claims, 6 Drawing Sheets

FIG. 4A

DIAGRAM SHOWING URBAN AREA ELEVATION INFORMATION 154

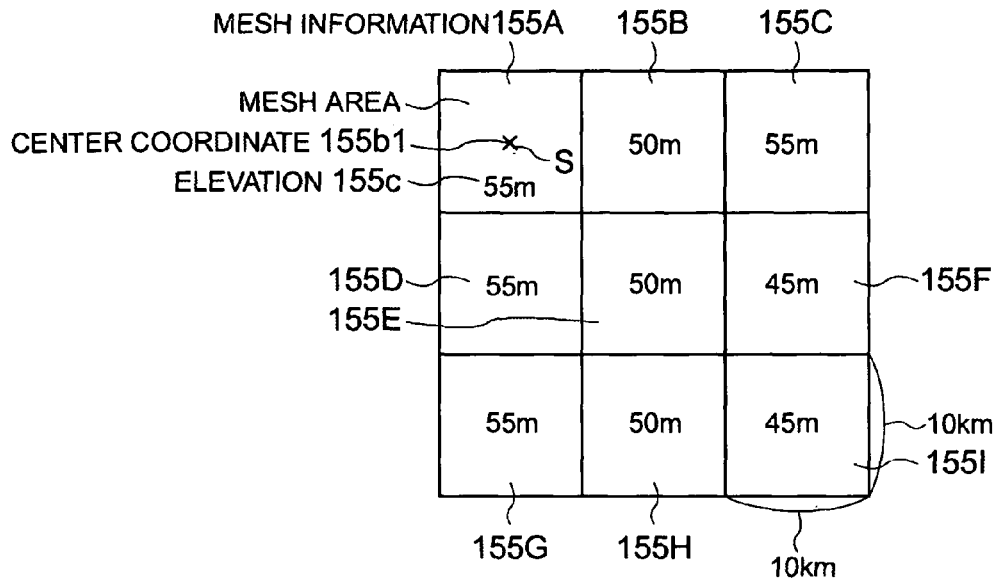

FIG. 4B

DIAGRAM SHOWING MESH INFORMATION 155A

| ITEM | SIZE | CONTENT |
|---|---|---|
| MESH ID (155a) | 4bit | NUMBER FOR IDENTIFYING MESH AREA |
| MESH AREA (155b) | 55bit | CENTER COORDINATE AND LENGTH OF ONE SIDE OF SQUARE |
| ELEVATION (155c) | 3bit | ELEVATION DATA VALUE |

MESH ID 155a : 0001 → 4bit

MESH AREA 155b : CENTER COORDINATE 155b1 :

N35°40'34.09"=0.6226660395rad X $2^{23}$=2611650 → 23bit

E139°44'14.47"=2.438876894rad X $2^{24}$=10229391 → 24bit

LENGTH OF ONE SIDE : 10km = 200 (MULTIPLIED BY 50m FOR CONVERSION) → 8bit

ELEVATION 155c : 55m=77m X $2^3$=440 → 3bit

POSITIONING DEVICE, CONTROL METHOD OF POSITIONING DEVICE, CONTROL PROGRAM FOR POSITIONING DEVICE, AND COMPUTER-READABLE RECORDING MEDIUM HAVING POSITIONING DEVICE CONTROLLING PROGRAM RECORDED THEREIN

BACKGROUND

1. Technical Field

The present invention relates to a positioning device for carrying out positioning on the basis of signals from positioning satellites, a control method for the positioning device, a control program for the positioning device, and a computer-readable recording medium in which the control program for the positioning device is recorded.

2. Related Art

There has been practically used a positioning system for detecting the present position of a GPS receiver by using a satellite navigation system such as GPS (Global Positioning System) or the like.

The GPS receiver receives signal electric waves from three or more GPS satellites (hereinafter referred to satellite signals), for example, and calculates the distance between each GPS satellite and the GPS receiver (hereinafter referred to as pseudo range) on the basis of the difference between the transmission time of the satellite signal from each GPS satellite and the reception time of the satellite signal concerned at the GPS receiver (hereinafter referred to as delay time). Then, the GPS receiver carries out the positioning calculation of the present position of the GPS receiver by using information on the position on the satellite orbit and pseudo range of each GPS satellite.

Here, in some cases, the GPS receiver receives indirect waves induced when the electric wave from the GPS satellite is reflected from buildings, etc. (hereinafter referred to as a multipath). The multipath thus induced reaches the GPS receiver with a delay time with respect to the direct wave from the GPS satellite because it is induced due to the reflection of the electric wave from the GPS satellite from the buildings, etc. As a result, there is a problem that the pseudo range is deviated to be longer, and a large error occurs in the positioning calculation.

On the other hand, there has been proposed a technique of carrying out positioning while excluding the multipath by taking it into consideration that the signal intensity of the multipath is weaker than the direct wave (for example, JP-A-2001-272450 (FIG. 2, etc.)).

However, in an urban area where tall buildings stand side by side, there are some cases where it is impossible to receive direct waves from GPS satellites whose number is needed for the positioning, and there is a problem that if the multipath is excluded, the positioning itself would be impossible.

SUMMARY

Therefore, an advantage of some aspects of the present invention is to provide a positioning device that can suppress the load of a storage capacity to the minimum level and carry out positioning in a multipath recurrent district with high precision by using a simple construction, a control method of the positioning device, a control program for the positioning device and a computer-readable recording medium in which the control program for the positioning device is recorded.

In order to attain the above advantage, according to a first aspect of the present invention, a positioning device for receiving satellite signals corresponding to signals from positioning satellites comprises: a multipath recurrent district elevation information storing unit for storing multipath recurrent district elevation information indicating the elevation of a multipath recurrent district as elevation information of plural divisional areas; an elevation information obtaining position information generating unit for receiving the satellite signals and generating elevation information obtaining position information to obtain the elevation information; an elevation information obtaining unit for obtaining the elevation information of the divisional area corresponding to the elevation information obtaining position information; and an elevation information using present position information generating unit for generating elevation information using present position information indicating the present position on the basis of the satellite signals and the elevation information.

The multipath recurrent district is a district where a multipath occurs frequently, and thus all or some of the satellite signals from the GPS satellites reach the positioning device as multipaths, for example.

Here, when a multipath is excluded, there is a case where satellite signals from three or more GPS satellites cannot be used and thus it is impossible to carry out the positioning.

On the other hand, when a multipath is used for the positioning, there is a case where the error of the positioning result is extremely increased.

Here, if the elevation of the present position of the positioning device is known, the error of the positioning result can be suppressed to the minimum level even if the positioning is carried out by using a multipath.

In this sense, according to the construction of the first invention, the positioning device has the multipath recurrent district elevation information storing unit, and thus the multipath recurrent district elevation information indicating the elevation of the multipath recurrent district can be stored as the elevation information of plural divisional areas.

The positioning device has the elevation information obtaining position information generating unit, and thus it generates the elevation information obtaining position information. Furthermore, the positioning device has the elevation information obtaining unit, and thus it can obtain the elevation information of the divisional area corresponding to the elevation information obtaining position information from the multipath recurrent district elevation information storing unit.

The positioning device can generate the elevation information using present position information on the basis of the satellite signals and the elevation information by the elevation information using present position information generating unit.

Therefore, the positioning device can generate the elevation information using present position information having a small positioning error even in the multipath recurrent district.

In addition, the elevation information owned by the positioning device is limited to the elevation information of the multipath recurrent district and thus the load of the storage capacity of the positioning device is extremely small.

Furthermore, the positioning device can obtain the elevation information corresponding to the elevation information obtaining position information, and carries out the positioning by using the satellite signals and the elevation information, so that the construction of carrying out the positioning by using multipaths is simplified.

Accordingly, the positioning device can carry out the positioning with high precision even in the multipath recurrent district with a simple construction while suppressing the load of the storage capacity to the minimum level.

According to a second aspect of the invention, it is preferable that the construction of the first aspect is further equipped with an elevation information non-use present position information generating unit for generating elevation information non-use present position information indicating the present position on the basis of only the satellite signals when the elevation information obtaining unit does not obtain the elevation information.

The fact that the elevation information obtaining unit has obtained the elevation information unit that the present position of the positioning device is in the multipath recurrent district. On the other hand, the fact that the elevation information obtaining unit has obtained no elevation information unit that the present position of the positioning device is not in the multipath recurrent district.

In this sense, according to the construction of the second invention, in the multipath recurrent district, the elevation information using present position information generating unit can generate the present position information having a small positioning error by using the position-related signals and the elevation information.

On the other hand, out of the multipath recurrent district, the elevation information non-use present position information generating unit can generate the elevation information non-use present position information having excellent positioning precision by using direct waves from the positioning satellites.

Accordingly, the positioning device can carry out the positioning with high precision both in the multipath recurrent district and out of the multipath recurrent district with a simple construction.

According to a third aspect of the invention, it is preferable that the elevation information is the elevation information of an urban area.

According to the construction of the third aspect of the invention, the elevation information is limited to the elevation information of the urban area, and thus the load of the storage capacity of the positioning device can be further reduced. Therefore, the positioning device can further reduce the load of the storage capacity, and carry out the positioning with high precision in the multipath recurrent district of the urban area with a simple construction.

According to a fourth aspect of the invention, it is preferable that the elevation information comprises information for identifying the divisional area, information indicating the boundary of the divisional area and information indicating the elevation corresponding to the divisional area.

According to the construction of the fourth aspect of the invention, the elevation information is limited to the information indicating the boundary of the divisional area and the information indicating the elevation corresponding to the divisional area, and thus the information amount thereof is requisite minimum. Therefore, the positioning device can carry out the positioning with high precision in the multipath recurrent district of the urban area with a simple construction while suppressing the load of the storage capacity to the requisite minimum level.

According to a fifth aspect of the invention, it is preferable that the positioning precision of the elevation information obtaining position information is defined on the basis of the size of the divisional areas of the multipath recurrent district.

Each of the divisional areas is a rectangular area having four sides each of which is 10 kilometers (km). It is sufficient only to set the positioning precision of the elevation information obtaining position information to the extent that the divisional area corresponding to the position of the positioning device can be specified, and thus an error of 10 kilometers (km) is permitted.

In this sense, according to the construction of the fifth aspect of the invention, the positioning precision of the elevation information obtaining position information is defined on the basis of the size of each divisional area of the multipath recurrent district, and thus it is unnecessary to generate the elevation information obtaining position information with needlessly high precision. Therefore, the positioning device can generate the elevation information obtaining position information rapidly. Accordingly, the positioning device can rapidly generate the elevation information using present position information even in the multipath recurrent district.

According to a sixth aspect of the invention, a method of controlling a positioning device comprises: an elevation information obtaining position information generating step of receiving satellite signals corresponding to signals from positioning satellites and generating elevation information obtaining position information to obtain elevation information by a positioning device having multipath recurrent district elevation information storing unit for storing multipath recurrent district elevation information indicating the elevation of a multipath recurrent district as elevation information of plural divisional areas; an elevation information obtaining step of obtaining the elevation information of the divisional area corresponding to the elevation information obtaining position information from the multipath recurrent district elevation information storing unit by the positioning device; and an elevation information using present position information generating step of generating elevation information using present position information indicating the present position on the basis of the satellite signals and the elevation information by the positioning device.

According to the construction of the sixth aspect of the invention, as in the case of the construction of the first invention, the positioning device can carry out the positioning with high precision in the multipath recurrent district by a simple construction while suppressing the load of the storage capacity to the minimum level.

According to a seventh aspect of the invention, there is provided a positioning device control program for making a computer execute: an elevation information obtaining position information generating step of receiving satellite signals corresponding to signals from positioning satellites and generating elevation information obtaining position information to obtain elevation information by a positioning device having multipath recurrent district elevation information storing unit for storing multipath recurrent district elevation information indicating the elevation of a multipath recurrent district as elevation information of plural divisional areas; an elevation information obtaining step of obtaining the elevation information of the divisional area corresponding to the elevation information obtaining position information from the multipath recurrent district elevation information storing unit by the positioning device; and an elevation information using present position information generating step of generating elevation information using present position information indicating the present position on the basis of the satellite signals and the elevation information by the positioning device.

According to an eighth aspect of the invention, there is provided a computer-readable recording medium stored with a positioning device control program for making a computer execute: an elevation information obtaining position information generating step of receiving satellite signals corresponding to signals from positioning satellites and generating elevation information obtaining position information to obtaining elevation information by a positioning device having multipath recurrent district elevation information storing unit for storing multipath recurrent district elevation information indicating the elevation of a multipath recurrent district as elevation information of plural divisional areas; an elevation information obtaining step of obtaining the elevation information of the divisional area corresponding to the elevation information obtaining position information from the multipath recurrent district elevation information storing unit by the positioning device; and an elevation information using present position information generating step of generating elevation information using present position information indicating the present position on the basis of the satellite signals and the elevation information by the positioning device.

BRIEF DESCRIPTION OF THE DRAWINGS

The invention will be described with reference to the accompanying drawings, wherein like numbers reference like elements.

FIG. 4A is a diagram showing urban area elevation information.

FIG. 4B is a diagram showing mesh information.

DESCRIPTION OF EXEMPLARY EMBODIMENTS

Embodiments according to the invention will be described hereunder with reference to the accompanying drawings. The embodiments described hereunder are preferable embodiments of the invention, and thus various technically preferable limitations are provided thereto. However, the scope of the invention is not limited to these embodiments except when there is particularly some description limiting the invention.

Figure 1:
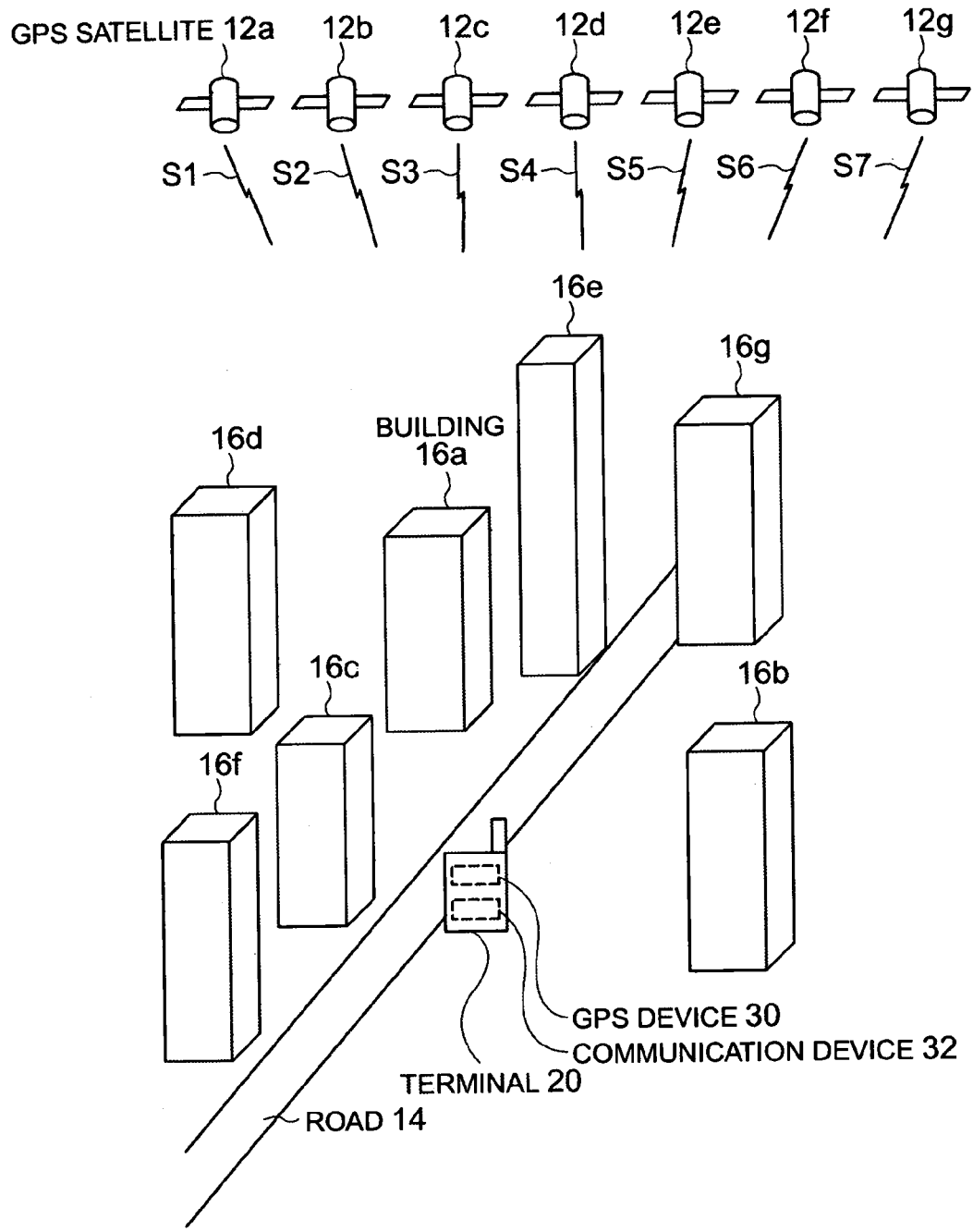
FIG. 1 is a diagram showing a terminal, etc. according to an embodiment of the present invention.

FIG. 1 is a schematic diagram showing a terminal 20, etc. according to an embodiment of the invention.

The terminal 20 is an example of a positioning device. As shown in FIG. 1, the terminal 20 has a GPS device 30. The terminal 20 can receive through the GPS device 30 satellite signals, for example, signals S1, S2, S3, S4, S5, S6 and S7 from plural positioning satellites, for example, GPS satellites 12a, 12b, 12c, 12d, 12e, 12f and 12g, respectively.

For example, the terminal 20 is located in the neighborhood of a road 14 located in an urban city of Tokyo, for example. Tall buildings 16a, 16b, 16c, 16d, 16e, 16f and 16g stand side by side in the neighborhood of the road 14. Therefore, the signals S1, etc. from the GPS satellites 12a, etc. do not reach the terminal 20 as direct waves, but reflect from the buildings 16a, etc. and reach the terminal 20 as multipaths. The terminal 20 is designed so as to detect the present position by using this multipaths.

As shown in FIG. 1, the terminal 20 has a communication device 32. The terminal 20 can communicate with other terminals, etc. through a communication base station and the internet (not shown) by the communication device 32. For example, the terminal 20 is a cellular phone, PHS (Personal Handy-phone System), PDA (Personal Digital Assistance) or the like, however, it is not limited to these elements.

Unlike this embodiment, the number of the GPS satellites 12a, etc. is not limited to seven, and it may be equal to six or less, or eight or more. The example of the positioning device is not limited to the terminal device such as the terminal 20 or the like, and it may be a positioning module or positioning chip that constitutes the terminal device such as the terminal 20 or the like. Main Hardware Construction of Terminal 20

Figure 2:
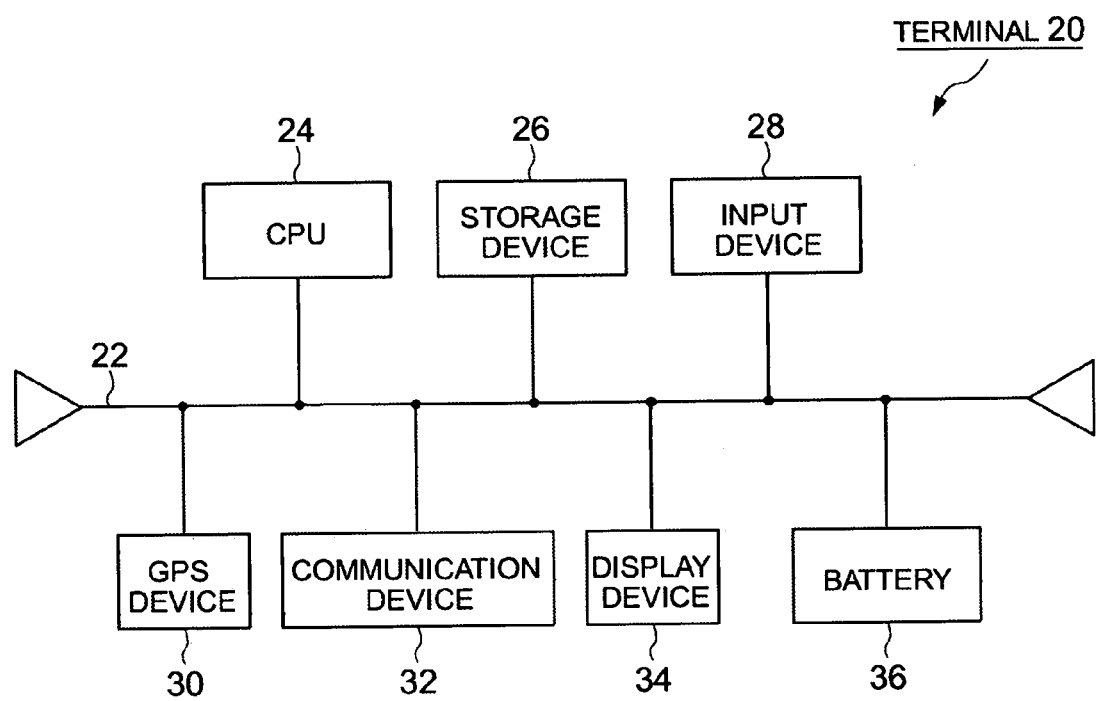
FIG. 2 is a diagram showing a main hardware construction of the terminal.

FIG. 2 is a diagram showing the main hardware construction of the terminal 20.

As shown in FIG. 2, the terminal 20 has a computer, and the computer has a bus 22. CPU (Central Processing Unit) 24, a storage device 26, etc. are connected to the bus 22.

For example, the storage device 26 is RAM (Random Access Memory), ROM (Read Only Memory) or the like.

To the bus 22 are connected an input device 28 for receiving various kinds of information and command inputs, a GPS device 30, a communication device 32, a display device 34 for displaying various kinds of information and a battery 36. Main Software Construction of Terminal 20

Figure 3:
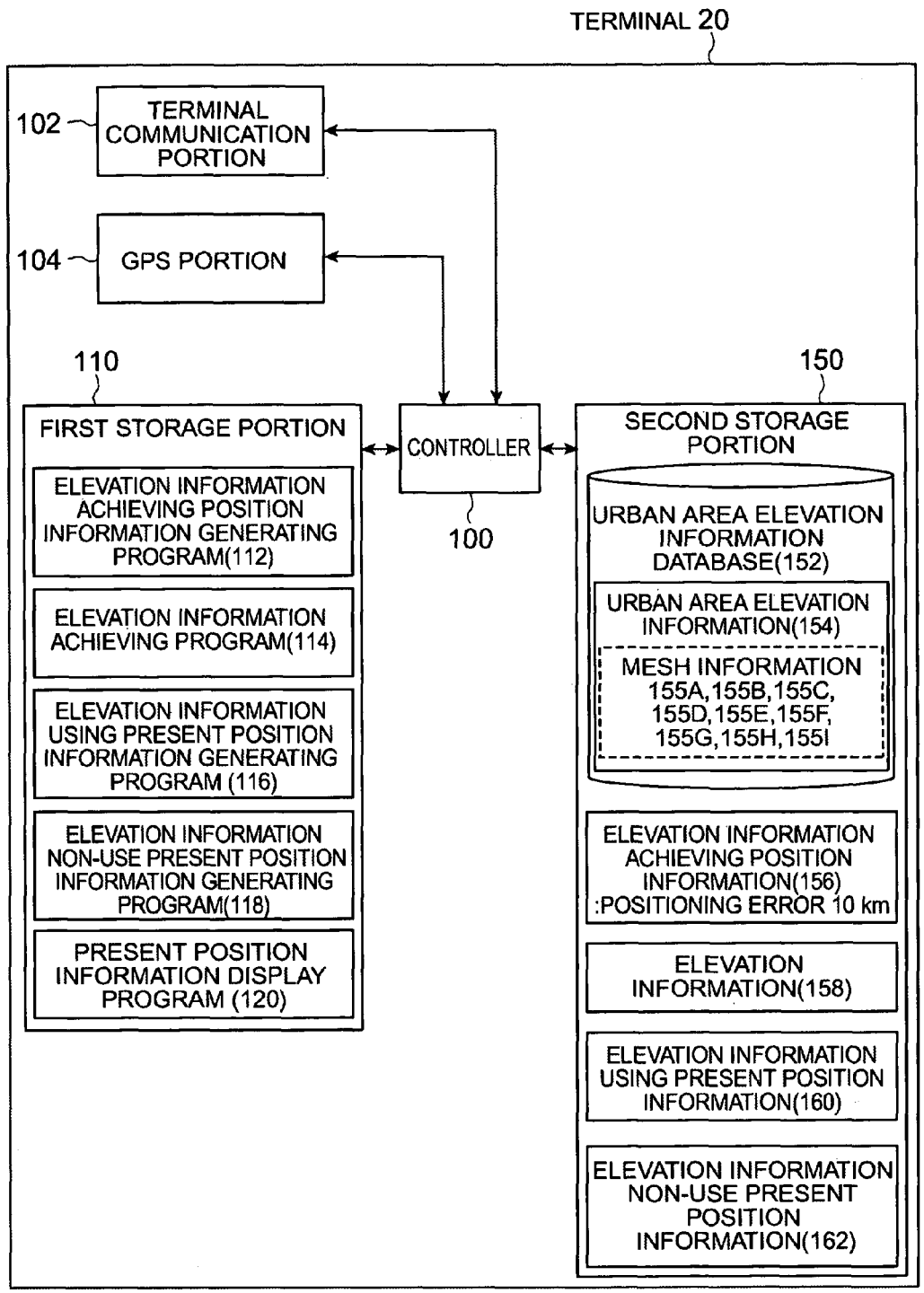
FIG. 3 is a diagram showing a main software construction of the terminal.

FIG. 3 is a diagram showing the main software construction, etc. of the terminal 20.

As shown in FIG. 3, the terminal 20 has a communication portion 102 corresponding to the communication device 32 of FIG. 2, a GPS portion 104 corresponding to the GPS device 30 of FIG. 2, etc. The terminal 20 has a first storage portion 110 for storing various kinds of programs, and a second storage portion 150 for storing various kinds of information.

As shown in FIG. 3, in the terminal 20, an urban area elevation information data base 152 is stored in the second storage portion 150. Urban area elevation information 154 is stored in the urban area elevation information data base 152.

The urban area elevation information 154 is limited to elevation information of an inner city, and it is the elevation information of the inner city of Tokyo, for example. As shown in FIG. 1, in the inner city of Tokyo, tall buildings 16a, etc. stand side by side, and the signals S1, etc. from the GPS satellites 12a, etc. reach the terminal 20 as multipaths. That is, the inner city of Tokyo is an example of a multipath recurrent district. The inner city is an example of the urban area. The urban area elevation information 154 is an example of multipath recurrent district elevation information, and the urban area elevation information data base 152 is an example of multipath recurrent district elevation information storing unit.

As shown in FIG. 3, the urban area elevation information 154 is constructed by plural mesh information 155A to 155I. Each of the mesh information 155A, etc. is information indicating the elevation of each mesh area described below. Each mesh area is an example of a divisional area, and each mesh information 155A, etc. is an example of elevation information.

As described below, the urban area elevation information 154 is stored as the plural mesh information 155A, etc. in the urban area elevation information data base 152.

FIG. 4 is a diagram showing the urban area elevation information 154, etc.

As shown in FIG. 4A, the inner city of Tokyo is defined as data of a rectangular area having four sides each having a length of 30 kilometers (km), and it comprises nine mesh square areas of 10 kilometers (km) on one side.

Here, the inner city of Tokyo is constructed by nine mesh areas because it has been found that the inner city of Tokyo has little vertical drop and thus if it is sectioned by areas having substantially equal elevation, it could be sufficiently sectioned by nine mesh areas.

As shown in FIG. 4B, the mesh information 155A is constructed by three kinds of items of a mesh ID 155a, a mesh area 155b and elevation 155c. The mesh information 155B to 155I has the same construction.

In order to identify each mesh area, the mesh ID 155a is information having a data size of four bits (bit) of 0001. The mesh area 155b is information representing the boundary of each mesh area, and for example, it is information representing the center coordinate 155b1 indicating the center point s of the mesh area and the length of one side of the mesh area of 10 kilometers (km). The center coordinate 155b1 is represented by numeric data having the precision of $1/100$ seconds like latitude 35 degrees, 40 arc-minutes, 34 arc-seconds, 09 north and longitude 139 degrees, 44 arc-minutes, 14 arc-seconds, 47 east. When the length of one side of 10 kilometers (Km) is represented by a numeric value of 200, 55 bits (bit) is sufficient as the data size.

The elevation 155c is information representing the elevation corresponding to each mesh area. For example, when the elevation 155c is represented by numeric data of 55 meters with the precision of 1 meter (m), it has the data size of 3 bits (bit).

As described above, each mesh information 155A, etc. constituting the urban area elevation information 154 comprise the mesh ID 155a of 4 bits (bit), the mesh area 155b of 55 bits (bit) and the elevation 155c of 3 bits, and thus the data size of each mesh information 155A, etc. is equal to 62 bits (bit).

The urban area elevation information 154 comprises nine mesh information 155A, etc., and thus the data size of the urban area elevation information 154 is equal to 558 bits (bit). The data size is extremely small as compare with a case where general nationwide elevation information of Japan is used. For example, by taking a digital elevation model (DEM: Digital Elevation Model) of Geographical Survey Institute as an example, a contour map of $1/25,000$ (second mesh) is divided into 200 equal parts in each of the longitude and latitude directions to obtain squares ($1/20$ mesh, about 2 mm×2 mm on the contour map of $1/25,000$), and the elevation at the center of each square is recorded. The number of mesh areas is equal to 6,040,000(151×200×200) all over Japan, and the data size of the elevation information thereof is remarkably large. When the area is limited to Tokyo, each square is fractionized, and thus the number of mesh areas is equal to 40000 (200×200), and the data size of the elevation information thereof is remarkably larger than the data size of the terminal 20.

As shown in FIG. 3, the terminal 20 stores a position information generating program 112 for obtaining elevation information in the first storage portion 110. The elevation information obtaining position information generating program 112 is a program for generating elevation information obtaining position information 156 with which a controller 100 obtains the elevation 155c (see FIG. 4) of the mesh area corresponding to the present position of the terminal 20 from the urban area elevation information data base 152. That is, the elevation information obtaining position information generating program 112 and the controller 100 are examples of elevation information obtaining position information generating unit.

The elevation information obtaining position information 156 is information representing the coordinate of the present position of the terminal 20 with the latitude and the longitude. The elevation information obtaining position information 156 is generated to specify any mesh area (see FIG. 4A) at which the terminal 20 is located and obtain the elevation 155c of the mesh area, and thus the positioning precision is defined by the size of the mesh area. For example, it is set to 10 kilometers (km) which is the same length as one side of the mesh area.

The controller 100 stores the generated elevation information obtaining position information 156 into the second storage portion 150 of the terminal.

As shown in FIG. 3, the terminal 20 stores an elevation information obtaining program 114 in the first storage portion 110. The elevation information obtaining program 114 is a program with which the controller 100 obtains the elevation 155c of the mesh area corresponding to the elevation information obtaining position information 156 from the urban area elevation information data base 152. That is, the elevation information obtaining program 114 and the controller 100 are examples of elevation information obtaining unit.

For example, when the coordinate represented by the elevation information obtaining position information 156 is a coordinate within the mesh area (see FIG. 4A) indicated by the mesh information 155A, the controller 100 obtains the elevation 155c indicating 55 meters (m), and stores the elevation 155c concerned as elevation information 158 into the second storage portion 150.

As shown in FIG. 3, the terminal 20 stores an elevation information using present position information generating program 116 in the first storage portion 110. The elevation information using present position information generating program 116 is a program with which the controller 100 generates elevation information using present position information 160 indicating the present position of the terminal 20 on the basis of the signals S1, etc. received by the GPS portion 104 and the elevation information 158. That is, the elevation information using present position information generating program 116 and the controller 100 are examples of elevation information using present position information generating unit.

The controller 100 stores the elevation information using present position information 160 thus generated into the second storage portion 150.

Generation of elevation information using present position information 160 with reducing the effect of the multipath will be described hereunder with reference to FIG. 5.

Figure 5:
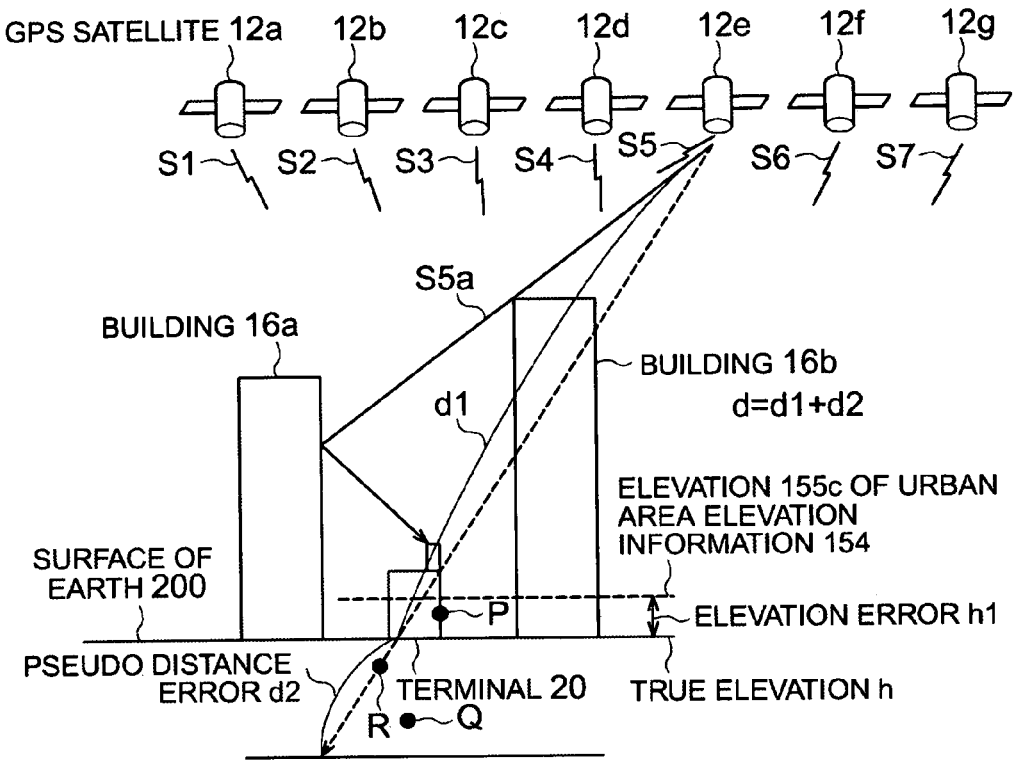
FIG. 5 is a diagram showing reduction of the effect of multipath.

FIG. 5 is a diagram showing the reduction of the effect of the multipath.

It is assumed that the true position of the terminal 20 is a known spot P. At the spot P, the signals S1, etc. from the GPS satellites 12a, etc. are disturbed by the buildings 16a and 16b and do not reach the terminal 20 as direct waves. For example, the signal S5 from the GPS satellite 12e reaches the terminal 20 as a multipath S5a. Therefore, an original pseudo distance d1 is not obtainable, and the pseudo distance d corresponding to the sum of the pseudo distance d1 and a pseudo distance error d2 is obtained. The pseudo distance error d2 is extremely large. When the signal arrives at the terminal 20 with a delay time of one micro second (μs), an error of about 300 meters (m) occurs. The same is applied to the signals from the other GPS satellites 12a, etc.

Furthermore, with respect to the error of the elevation 155c of the urban area elevation information 154 at the spot P, even when there is an elevation error h1 from the true elevation h of the surface of earth, the mesh area in which the terminal 20 is located is defined as a square of 10 kilometers (km) on one side because the urban area is substantially flat and thus the mesh area is assumed to be a flat spread district, so that the elevation error h1 is very small and it is within 50 meters (m). That is, the elevation error h1 is further smaller than the pseudo distance error d2.

Therefore, the positioning error PosRerror when the positioning position is calculated by using the signals from the GPS satellites 12a, etc. and the urban area elevation information 154 is smaller than the positioning error PosQerror when the positioning spot Q is calculated on the basis of only the signals from the GPS satellites 12a, etc.

In FIG. 5, the equations of PosQerror=f1 (errori), PosRerror=f2 (errori, alttableerror) are used, and errori represents a variable indicating the pseudo distance error d2 based on the signals S1, etc. from the GPS satellites 12a, etc. Alt tableerror is a variable representing the elevation error h1. f1 and f2 represent functions for calculating the errors, and they are defined by position dilution of precision PDOP (Position Dilution Of Precision) and positioning precision unitError.

As shown in FIG. 3, the terminal 20 stores an elevation information non-using present position information generating program 118 in the first storage portion 110. When the controller 100 does not obtain the elevation information 158 by the elevation information obtaining program 114, the elevation information non-using present position information generating program 118 generates elevation information non-using present position information 162 indicating the present position of the terminal 20 on the basis of only the signals S1, etc. received by the GPS portion 104. That is, the elevation information non-using present position information generating program 118 and the controller 100 are examples of elevation information non-using present position information generating unit.

When the controller 100 does not obtain the elevation information 158 by the elevation information obtaining program 114, it means that the position of the terminal 20 is not in the multipath recurrent district. In this case, the direct waves such as the signals S1, etc. can be received from the GPS satellites 12a, etc., and thus the present position can be detected with high precision.

As described above, the terminal 20 has the elevation information using present position information generating program 116 and the elevation information non-using present position information generating program 118. When the controller 100 obtains the elevation information 158 by the elevation information obtaining program 114, the elevation information using present position information 160 is generated by the elevation information using present position information generating program 116. When the controller 100 does not obtain the elevation information 158 by the elevation information obtaining program 114, the elevation information non-using present position information 162 is generated by the elevation information non-using present position information generating program 118.

Therefore, the terminal 20 can be positioned with high precision both in the multipath recurrent district and out of the multipath recurrent district with a simple construction.

As shown in FIG. 3, the terminal 20 stores a present position information display program 120 in the first storage portion 110. The present position information display program 120 is information with which the controller 100 displays the elevation information using present position information 160 or the elevation information non-using present position information 162 on the display device 34 (see FIG. 2).

As described above, all or some of the signals S1, etc. from the GPS satellites 12a, etc. reach the terminal 20 as multipaths in the multipath recurrent district, for example, in the inner city of Tokyo.

Here, when the multipaths are excluded, it may be impossible to use the signals from the three or more GPS satellites 12a, etc., so that the positioning cannot be performed.

On the other hand, if the positioning is carried out by using the multipaths, the error of the positioning result may be extremely large.

In this sense, the terminal 20 can store the urban area elevation information 154 into the urban area elevation information data base 152.

Then, the terminal 20 can generate the elevation information obtaining position information 156, and obtain the elevation information 155c of the mesh area corresponding to the elevation information obtaining position information 156 from the urban area elevation information data base 152.

The terminal 20 can generate the elevation information using present position information 160 on the basis of the signals S1, etc. and the elevation information 155c.

Therefore, the terminal 20 can also generate the elevation information using present position information 160 having a small positioning error even in the multipath recurrent district.

In addition, the urban area elevation information 154 owned by the terminal 20 is limited to the elevation information of the urban area corresponding to the multipath recurrent district, and thus the load imposed on storage capacity of the terminal 20 is extremely small.

Furthermore, the terminal 20 obtains the elevation 155c from the mesh information 155A corresponding to the elevation information obtaining position information 156, and it can carry out the positioning in combination with the signals S1, etc. so that the construction for carrying out the positioning by using the multipaths is simple.

Accordingly, the terminal 20 can carry out the high-precision positioning in the multipath recurrent district with a simple construction while minimizing the load of the storage capacity.

Furthermore, as described above, the urban area elevation information 154 is limited to the information for identifying the plural mesh areas constituting the multipath recurrent area, the information indicating the boundary of the mesh area and the information indicating the elevation corresponding to the mesh area, and thus the information amount is requisite minimum.

Therefore, the terminal 20 can carry out the positioning with high precision in the multipath recurrent district of the urban area with a simple construction while suppressing the storage capacity to the requisite minimum.

Furthermore, as described above, each mesh area is set to a rectangular area having four sides each of which is set to, for example, 10 kilometers (km) in length under the condition that the elevation is fixed.

The positioning precision of the elevation information obtaining position information 156 would be sufficient if any mesh area corresponding to the position of the terminal 20 can be specified, and thus there is no problem even when an error of 10 kilometers (km) occurs.

In this sense, the positioning precision of the elevation information obtaining position information 156 is defined on the basis of the size of each mesh area of the multipath recurrent district, and thus it is unnecessary to generate needlessly high-precision elevation information obtaining position information 156.

Therefore, the terminal 20 can rapidly generate the elevation information obtaining position information 156. Accordingly, the terminal 20 can rapidly the elevation information using present position information 160 even in the multipath recurrent district.

Unlike the above embodiment, the urban area elevation information 154 may be constructed by only mesh information 155A indicating the inner area of the Yamanote line of Tokyo, for example. Accordingly, when the area of the activities of the sphere of activities of the user of the terminal 20 is limited to the neighborhood of the Yamanote line of Tokyo, the load of the storage capacity of the terminal 20 can be further reduced while providing the same effect as the above embodiment.

Furthermore, the urban area elevation information 154 may contain not only the inner city of Tokyo, but also multipath recurrent districts such as the center portion of Osaka, etc. Accordingly, when the activities area of the user of the terminal 20 expands across the whole country of Japan, the same effect as the above embodiment can be provided without excessively increasing the load of the storage capacity of the terminal 20.

The construction of the terminal 20 of this embodiment has been described above, and an example of the operation thereof will be described mainly with reference to FIG. 6.

Figure 6:
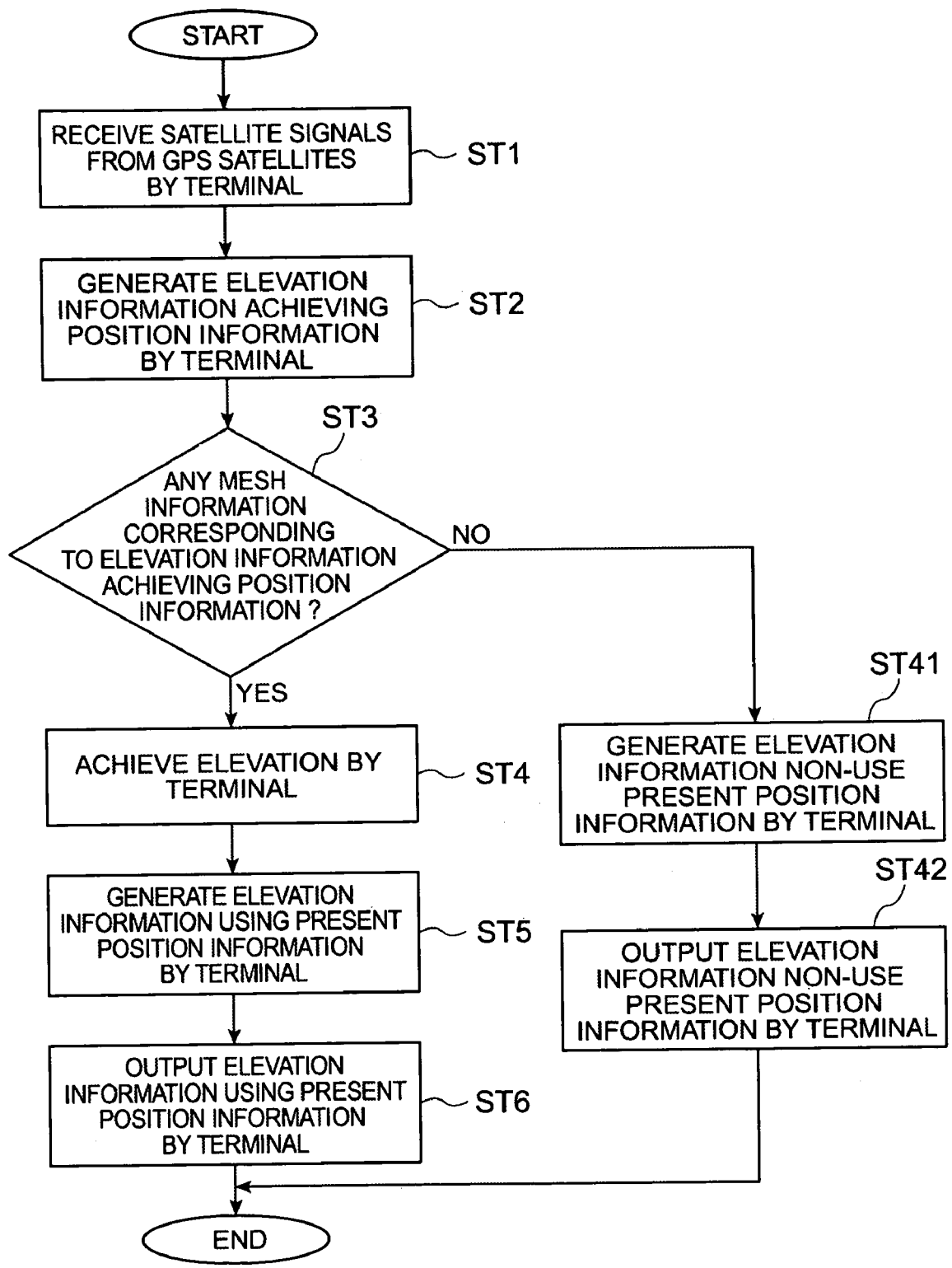
FIG. 6 is a flowchart showing an operation example of the terminal.

FIG. 6 is a flowchart showing the operation of the terminal 20. In the following description, the terminal 20 is assumed to be located in the mesh area indicated by the mesh information 155A (see FIG. 4A).

First, the terminal 20 receives the signals S1, etc. from the GPS satellites 12*a*, etc. (step ST1 of FIG. 6). Subsequently, the terminal 20 generates the elevation information obtaining position information 156 (see FIG. 3) (step ST2). This step ST2 is an example of the elevation information obtaining position information generating step. In this case, the elevation information obtaining position information 156 indicates some coordinate of the mesh area indicated by the mesh information 155A.

Subsequently, the terminal 20 judges whether the mesh information 155A corresponding to the elevation information obtaining position information 156 exists in the urban area elevation information data base 152 (step ST3). When it is judged that the mesh information 155A corresponding to the elevation information obtaining position information 156 exists in the urban area elevation information data base 152, the terminal 20 obtains the elevation 155*c* of the mesh information 155A corresponding to the elevation information obtaining position information 156 from the urban area elevation information data base 152 (step ST4). The steps ST3 and ST4 are examples of the elevation information obtaining step.

Subsequently, the terminal 20 generates the elevation information using present position information 160 (step ST5). Subsequently, the terminal 20 outputs the elevation information using present position information 160, and displays it on the display device 34, for example (see FIG. 2) (step ST6).

On the other hand, if the terminal 20 judges in step ST3 that the mesh information 155A corresponding to the elevation information obtaining position information 156 does not exist in the urban area elevation information data base 152, the terminal 20 generates the elevation information non-use present position information 162 (step ST41). Subsequently, the terminal 20 outputs the elevation information non-use present position information 162, for example, outputs it to the display 34 (see FIG. 2) (step ST42).

Therefore, the terminal 20 can carry out the positioning with high precision without excluding the multipaths in the multipath recurrent district by the simple construction, and also can carry out the positioning with high precision even out of the multipath recurrent district. Program and Computer-readable Recording Medium, etc.

A control program for the positioning device is provided to make a computer execute the operations described above, that is, the elevation information obtaining position information generating step, the elevation information obtaining step, the elevation information using present position information generating step, etc.

Furthermore, a computer-readable recording medium or the like in which the control program, etc. for the positioning device as described above is recorded may also be provided.

A program storage medium used to install the control program, etc. for the positioning device into a computer and allow the computer execute the program may be implemented by not only a package medium such as a flexible disk such as a floppy (registered trademark), CD-ROM (Compact Disc Read Only Memory), CD-R (Compact Disc-Recordable), CD-RW (Compact Disc-Rewriterble), DVD (Digital Versatile Disc) or the like, but also a semiconductor memory, a magnetic disc, an magnetooptical disc or the like in which the program is temporarily or permanently stored.

The present invention is not limited to the above embodiments, and the above embodiments may be mutually combined with each other.

What is claimed is:

1. A positioning device that receives satellite signals that may include a multipathed satellite signal from positioning satellites, the positioning device comprising:
    a storing unit that stores divisional area information including an altitude, a length of a boundary, and a center coordinate of each of a plurality of divisional areas in a multipath recurrent district;
    an area specifying unit that specifies a divisional area based on the satellite signals received, the divisional area being one of the plurality of divisional areas in which the positioning device is estimated to be located;
    an altitude information obtaining unit that obtains an altitude for the divisional area from the divisional area information stored in the storing unit; and
    a first position generating unit that generates a present position of the positioning device using the satellite signals received and the altitude information for the divisional area.

2. The positioning device according to claim 1, further comprising
    a second position generating unit that generates a present position of the positioning device using the available satellite signals when the altitude information obtaining unit fails to obtain the altitude information for the divisional area.

3. The positioning device according to claim 1, wherein the multipath recurrent district is in an urban area.

4. The positioning device according to claim 1, wherein the altitude information includes information identifying each of the plurality of divisional areas.

5. The positioning device according to claim 1, wherein a positioning accuracy of divisional area depends on size of each of the plurality of divisional areas.

6. A method of controlling a positioning device equipped with a storing unit that stores divisional area information including an altitude, a length of a boundary, and a center of coordinate of each of a plurality of divisional areas of a multipath recurrent district, the method comprising:
    receiving satellite signals that may include a multipathed satellite signal from positioning satellites;

specifying a divisional area based on the satellite signals received, the divisional area being one of the plurality of divisional areas in which the positioning device is estimated to be located;

obtaining an altitude for the divisional area from the divisional area information;

and generating a present position of the positioning device using the satellite signals received and the altitude for the divisional area.

7. A positioning device control program, that controls a positioning device equipped with a storing unit that stores divisional area information including an altitude, length of a boundary, and a center coordinate of each of a plurality of divisional areas, that makes a computer to execute:

receiving satellite signals that may include a multipathed satellite signal from positioning satellites;

specifying a divisional area based on the satellite signals received, the divisional area being one of the plurality of divisional areas in which the positioning device is estimated to be located;

obtaining an altitude for the divisional area based on the divisional area information;

and generating a present position of the positioning device using the satellite signals and the altitude for the divisional area.

8. A computer-readable recording medium, stored with a positioning device control program that controls a positioning device equipped with a storing unit that stores divisional area information including an altitude, a length of a boundary, and a center coordinate of each of a plurality of divisional areas, comprising:

receiving satellite signals that may include a multipathed satellite signal from positioning satellites;

specifying a divisional area based on the satellite signals received, the divisional area being one of the plurality of divisional areas in which the positioning device is estimated to be located;

obtaining an altitude for the divisional area from the divisional area information;

and generating a present position of the positioning device using the satellite signals received and the altitude for the divisional area.

* * * * *

UNITED STATES PATENT AND TRADEMARK OFFICE
CERTIFICATE OF CORRECTION

PATENT NO. : 7,907,088 B2
APPLICATION NO. : 11/312554
DATED : March 15, 2011
INVENTOR(S) : Maho Terashima et al.

It is certified that error appears in the above-identified patent and that said Letters Patent is hereby corrected as shown below:

On the cover page change the listing of item [75] Inventors from

"[75] Inventors: Maho Terashima, Matsumoto (JP);
   Tomoyu Kurata, Matsumoto (JP)"

to

-- [75] Inventors: Maho Terashima, Matsumoto (JP);
   Tomoyuki Kurata, Matsumoto (JP) --

Signed and Sealed this
Seventeenth Day of May, 2011

David J. Kappos
*Director of the United States Patent and Trademark Office*